United States Patent
Kolb et al.

(10) Patent No.: US 8,276,880 B2
(45) Date of Patent: Oct. 2, 2012

(54) BUTTERFLY VALVE PLATE SEALING ASSEMBLY

(75) Inventors: Craig Kolb, Apache Junction, AZ (US); David Pantier, Gilbert, AZ (US); Joel LaBenz, Chandler, AZ (US); Scott Martin, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 532 days.

(21) Appl. No.: 12/473,774

(22) Filed: May 28, 2009

(65) Prior Publication Data
US 2010/0301249 A1   Dec. 2, 2010

(51) Int. Cl.
*F16K 1/22* (2006.01)

(52) U.S. Cl. .............. 251/306; 251/314; 251/317.01; 277/500

(58) Field of Classification Search .......... 251/305, 251/306, 314, 317.01; 277/500; 123/337
See application file for complete search history.

(56) References Cited

U.S. PATENT DOCUMENTS

| | | | | |
|---|---|---|---|---|
| 1,591,903 A | * | 7/1926 | White | 251/175 |
| 3,508,737 A | * | 4/1970 | Sikorcin | 251/306 |
| 3,556,475 A | * | 1/1971 | Olenik | 251/306 |
| 4,899,984 A | * | 2/1990 | Strickler et al. | 251/306 |
| 4,944,489 A | * | 7/1990 | Adams et al. | 251/306 |
| 5,607,140 A | * | 3/1997 | Short et al. | 251/305 |
| 5,975,494 A | * | 11/1999 | Gasaway | 251/306 |
| 7,165,772 B1 | | 1/2007 | Camacho | |
| 2007/0045586 A1 | * | 3/2007 | Shimane et al. | 251/306 |

* cited by examiner

*Primary Examiner* — John K Fristoe, Jr.
*Assistant Examiner* — Marina Tietjen
(74) *Attorney, Agent, or Firm* — Ingrassia Fisher & Lorenz, P.C.

(57) ABSTRACT

Butterfly valve plate sealing assemblies are provided that include a sealing ring and a retention spacer disposed at least partially within a sealing ring groove formed about a periphery of a butterfly valve plate. The sealing ring includes a first portion, a second portion configured substantially perpendicular to the first portion, and a substantially L-shaped cross-section. The sealing ring is positioned at least partially within a groove opening and a groove body defining the sealing ring groove. The retention spacer is positioned at least partially within the groove opening and adjacent the first portion of the sealing ring. The retention spacer is configured to limit expansion of the sealing ring when under the influence of a pressurized fluid flow. The second portion of the sealing ring may be configured to optimize stiffness for a desired sealing ring tension.

9 Claims, 5 Drawing Sheets

BUTTERFLY VALVE PLATE SEALING ASSEMBLY

TECHNICAL FIELD

The inventive subject matter relates to butterfly valve assemblies and, more particularly, to a butterfly valve sealing ring assembly for use with a single piece butterfly plate.

BACKGROUND

Valves may be employed in any one of numerous situations. For example, valves may be used in an air distribution system to allow, control, or shut off airflow from one portion of an aircraft's ducting to another. In this regard, pneumatic valves may be disposed in a duct between an air source and one or more outlets to control the flow of the received air that is distributed to other components or areas in the aircraft, such as, for example, the environmental control system or an aircraft cabin.

One exemplary type of pneumatic valve that has been employed in aircraft is a butterfly valve. A butterfly valve is typically made up of a valve flowbody and a butterfly plate. The valve flowbody may be made of a rigid material, such as metal, and includes a channel or bore therethrough, defined by an inner surface. The valve flowbody is configured to be disposed between two ducts or disposed in a portion of a single duct. The butterfly plate is made of a rigid material as well and is rotationally mounted to the valve flowbody. Conventionally, the butterfly plate is positioned in the channel such that a minimum clearance is formed with the inner surface of the valve flowbody. An actuator and a spring may be used to control the rotation of the butterfly plate.

Typically, the butterfly plate is moved between closed, open, and partially open positions. When in the closed position, where the butterfly plate is perpendicular or near perpendicular in the flowbody bore, the butterfly plate substantially blocks the channel to prevent, or at least inhibit, fluid from flowing therethrough. When fluid flows through the valve flowbody in a forward direction, the butterfly plate moves to the open or partially open position to allow fluid flow through the channel. To provide for sealing of the butterfly valve plate relative to the channel, the butterfly valve plate includes a sealing ring groove about a periphery into which is seated a sealing ring. During rotation of the butterfly valve plate, the sealing ring engages the channel wall, and provides sealing about the periphery of the butterfly valve plate. The sealing ring must be properly positioned during installation and maintained in proper alignment with respect to the periphery of the butterfly valve plate to achieve adequate sealing effects. During operation of the valve, the sealing ring has a tendency to expand outwards from the butterfly valve plate when under the influence of a pressure. More particularly, when the butterfly valve plate is in an open position, the sealing ring is not in direct contact with the channel and may come out of the sealing ring groove into which it is positioned. In particular, the flow of fluid through the channel may cause a downstream portion of the sealing ring to expand and become misaligned relative to the sealing ring groove. When the butterfly valve plate is then closed, increased closing forces may exist as a result of the misaligned sealing ring. In some cases, the misaligned sealing ring may prevent the butterfly valve plate from fully closing when the sealing ring becomes lodged between the periphery of the butterfly valve plate and the channel.

Accordingly, there is a need for a butterfly valve plate sealing assembly that includes a means for constraining a sealing ring within a sealing ring groove with limited expansion of the sealing ring. More specifically, there is a need for a means to minimize misalignment of the sealing ring from within the sealing ring groove when the valve is pressurized. In addition, it would be desirable for the sealing assembly to be relatively inexpensive to implement. Furthermore, other desirable features and characteristics of the inventive subject matter will become apparent from the subsequent detailed description and the appended claims, taken in conjunction with the accompanying drawings and the foregoing technical field and background.

BRIEF SUMMARY

A butterfly valve sealing assembly is provided that includes a means for minimizing expansion of a butterfly valve sealing ring from within a sealing ring groove formed about a periphery of a butterfly valve plate in a butterfly valve.

In an embodiment, by way of example only, the butterfly valve sealing assembly includes a sealing ring disposed at least partially within the sealing ring groove; and a retention spacer, positioned adjacent the sealing ring and disposed at least partially within the sealing ring groove, the retention spacer configured to limit expansion of the sealing ring when under the influence of a pressurized fluid flow.

In another embodiment, by way of example only, the butterfly valve sealing assembly includes a sealing ring disposed at least partially within the sealing ring groove, the sealing ring having a first portion, a second portion configured substantially perpendicular to the first portion, and a substantially L-shaped cross-section; and a retention spacer, positioned adjacent the sealing ring and disposed at least partially within the sealing ring groove, the retention spacer configured to limit expansion of the sealing ring when under the influence of a pressurized fluid flow.

In yet another embodiment, by way of example only, a butterfly valve assembly includes a flowbody having an inner surface defining a channel; a butterfly plate disposed in the channel and rotationally mounted to the flowbody, the butterfly plate having a valve shaft coupled thereto and a sealing ring groove formed about a periphery of the butterfly plate; an actuator having an actuator output shaft coupled to the valve shaft, the actuator configured to actuate the butterfly plate; and a butterfly valve plate sealing assembly comprising: a sealing ring disposed at least partially within the sealing ring groove; and a retention spacer, positioned adjacent the sealing ring and disposed at least partially within the sealing ring groove, the retention spacer configured to limit expansion of the sealing ring when under the influence of a pressurized fluid flow.

Other independent features and advantages of the preferred means for retaining a butterfly valve sealing ring within a sealing ring groove formed about a periphery of a butterfly valve plate in a butterfly valve will become apparent from the following detailed description, taken in conjunction with the accompanying drawings which illustrate, by way of example, the principles of the inventive subject matter.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

It is contemplated that the present invention is particularly well suited for use with butterfly type valves, more particularly with butterfly type valves that are used in cabin environmental control systems. However, the present invention may also be applicable in other types of valves where a part or assembly rotates about a shaft, the sealing assembly includes dual components for sealing about a periphery of the rotating assembly and it is desirable to prevent unwanted movement of the sealing component from about the periphery of the rotating assembly when under the influence of a downstream pressure. In some instances it may also be applicable to non-valve assemblies as well.

It is contemplated that alternative embodiments will likely comprise elements in addition to those described in relation to FIGS. 1-7, and/or may include different numbers or types of the described elements. It is also contemplated that any element may be formed from any reasonable material or combination of materials.

Figure 1:
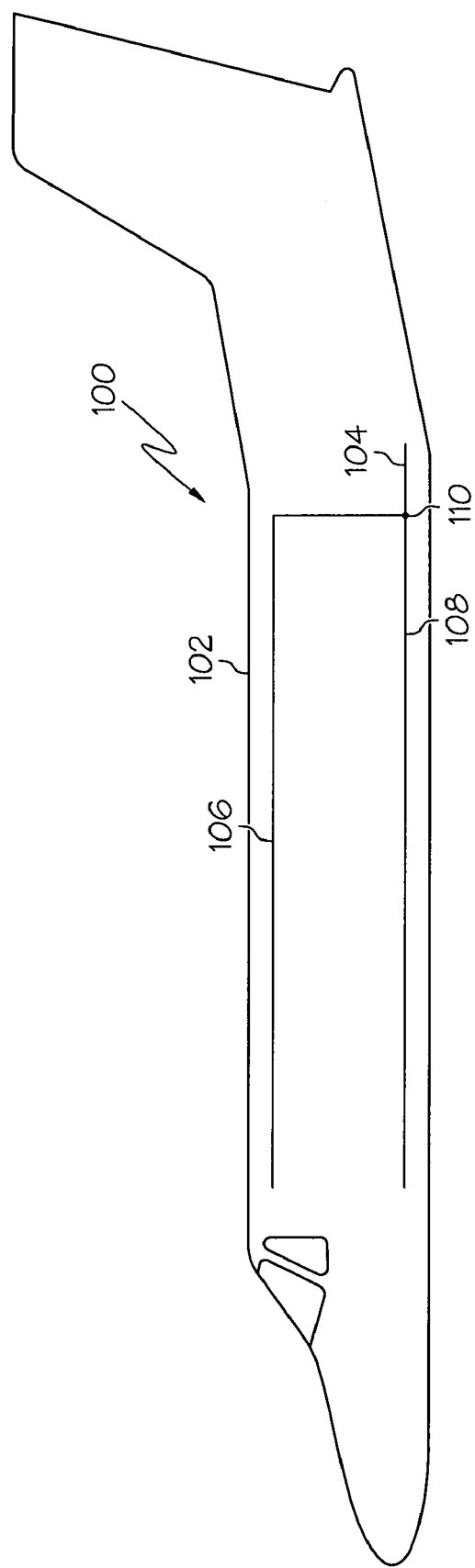
FIG. 1 is a simplified schematic diagram illustrating an exemplary air distribution system disposed within an aircraft, according to an embodiment.

FIG. 1 is a simplified schematic diagram illustrating an air distribution system 100 disposed within an aircraft 102, according to an embodiment. The air distribution system 100 includes an inlet duct 104, two outlet ducts 106, 108 and a valve assembly 110 positioned between the ducts 104, 106, 108. The inlet duct 104 receives air from an air source, such as, for example, engine bleed air, and the outlet ducts 106, 108 exhaust air into desired sections of the aircraft 102. In one exemplary embodiment, the outlet ducts 106, 108 exhaust air into an aircraft underfloor. It will be appreciated that although two outlet ducts 106, 108 are depicted herein, fewer or more outlet ducts may be incorporated into the air distribution system 100. The valve assembly 110 regulates air flow through one or more of the outlet ducts 106, 108 by opening or closing in response to the presence or absence of a pressure differential across the valve assembly 110 that exceeds a predetermined value. It should be understood that although a three-way butterfly valve configuration is illustrated in FIG. 1, this is merely for exemplary purposes and that two-way butterfly valve configurations are anticipated by this disclosure.

Figure 2:
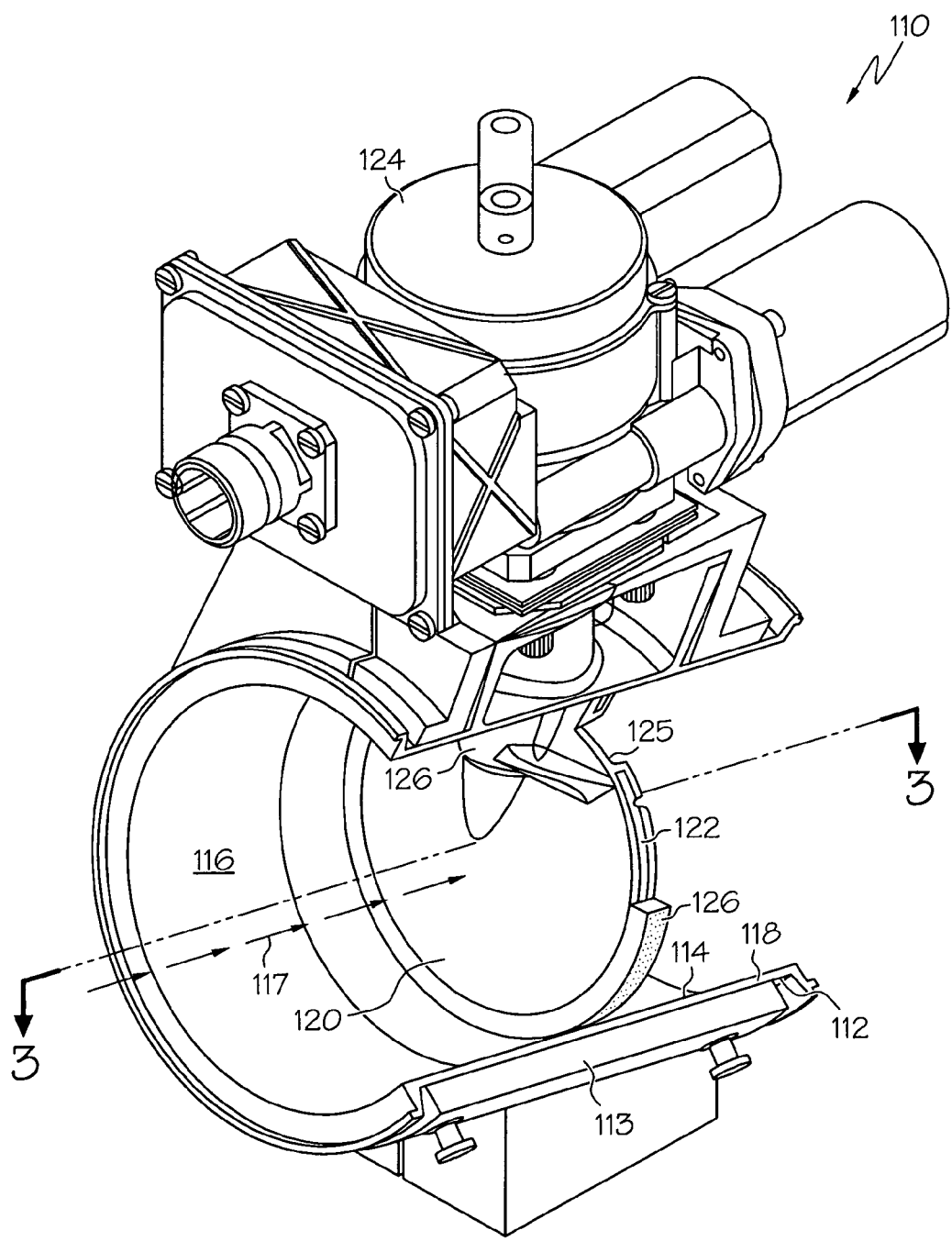
FIG. 2 is a cutaway view of a valve assembly that may be implemented into the air distribution system shown in FIG. 1, according to an embodiment.

FIG. 2 is a cross-sectional view of a valve assembly 110 that may be implemented into the air distribution system 100 shown in FIG. 1, according to an embodiment. The valve assembly 110 includes a valve flowbody 112 having an inner surface 114 that defines a channel 116 and an outer surface 118. The valve flowbody 112 is generally made of a metallic material, although alternate non-metallic materials are anticipated by this disclosure. Examples of suitable materials may include, but are not limited to, aluminum alloys, steel or titanium. Although a single channel 116 is shown formed in the valve flowbody 112, it will be appreciated that multiple channels may alternatively be incorporated. In an embodiment, the valve flowbody 112 may be surrounded by an insulator 113.

The channel 116 defines a flow path, indicated by arrows 117, through the valve assembly 110 which is opened and closed via rotation of a butterfly valve plate 120 disposed in the channel 116 and rotationally mounted to the valve flowbody 112. The actual size and shape of the channel 116 into which the butterfly valve plate 120 is disposed is not critical to the present invention. However, it is contemplated that the present invention is particularly advantageous when used in valves where the segment of the channel 116 within which the butterfly valve plate 120 rotates is cylindrical and has an internal diameter approximately equal to the diameter of the butterfly valve plate 120.

The butterfly valve plate 120 may be coupled to an actuator 124 that causes it to selectively open or close via a single drive shaft, two drive shaft segments, or to some other mechanism suitable for rotating the butterfly valve plate 120 about an axis of rotation passing through the channel 116. In some instances the axis of rotation may be perpendicular to the centerline of the channel 116 while in other instances it may not. In addition, the butterfly valve plate 120 may be tilted relative to the centerline of a drive shaft. The majority of the butterfly valve plate 120 is in the form of a cylindrical disk with the center line of the disk being substantially collinear with the center line of the channel 116 when the butterfly valve plate 120 is in a closed position, i.e. rotated such that the disk substantially or completely blocks the channel 116. The actuator 124 may be any actuating mechanism such that in some instances pressure differentials will be used to open and close the valve assembly 110. In an alternate embodiment, electrical power will be used to open and close the valve assembly 110. More particularly, the actuator 124 may include, but is not limited to, an electric actuator, a pneumatic actuator, a hydraulic actuator, or a manual actuator.

The butterfly valve plate 120 may comprise any reasonable size or shape such that it operates to at least partially open and close the flow path 117 defined by the channel 116. In a preferred embodiment, the butterfly valve plate 120 comprises a unitary structure cast or otherwise formed from steel, a metallic alloy, or some other material or combination of materials. The butterfly valve plate 120 includes a sealing ring groove 122 formed about a periphery 125 of the butterfly valve plate 120. A butterfly sealing assembly 126, retained within the sealing ring groove 122, provides for sealing of the butterfly valve plate 120 with the inner surface 114 that defines the channel 116.

Figure 3:
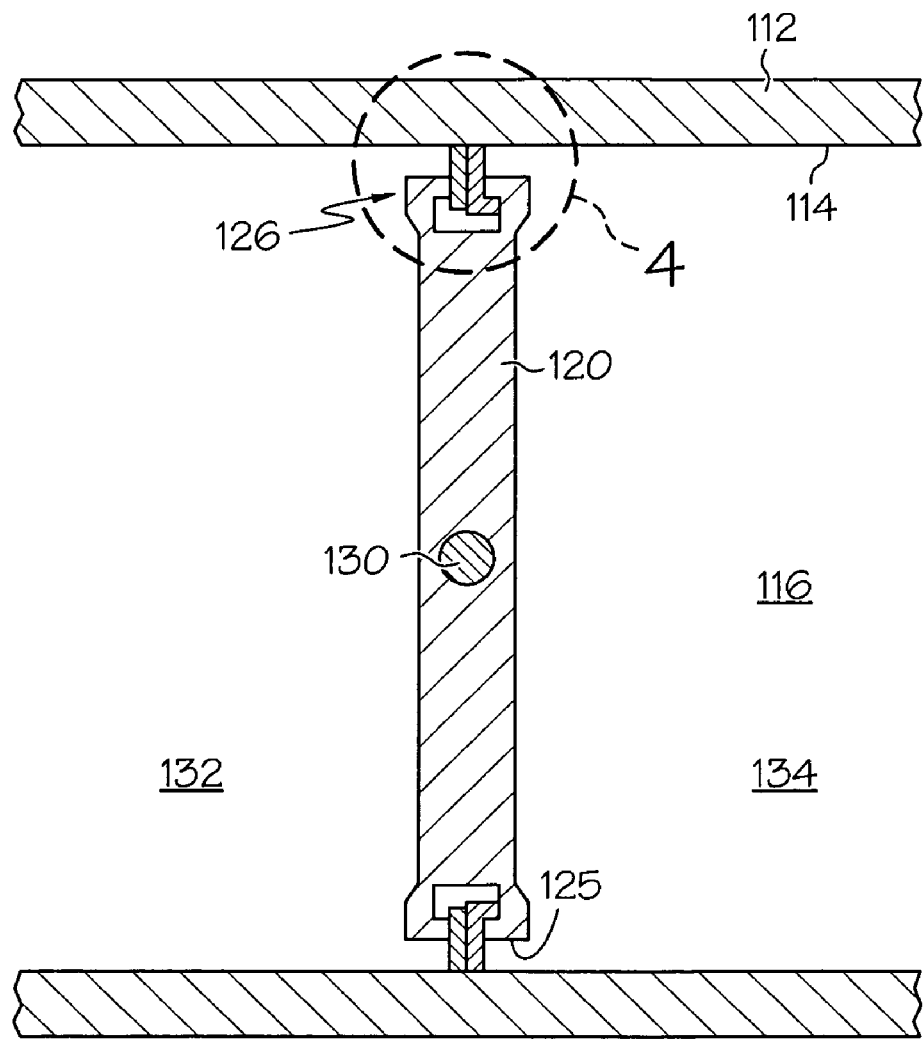
FIG. 3 is a cross-sectional view of a portion of the valve assembly shown in FIG. 2 taken along line 3-3, according to an embodiment.

Referring now to FIG. 3, illustrated is a close up cross-sectional view of a portion of the valve assembly shown in FIG. 2, according to an embodiment. Illustrated is a portion of the valve assembly 110, including the butterfly valve plate 120, a valve drive shaft 130 coupled to the butterfly valve plate 120, and the butterfly sealing assembly 126. The valve drive shaft 130 may be coupled at a first or upper end (not shown) to an output shaft of the actuator 124 (FIG. 2). As best illustrated in FIG. 3, the sealing assembly 126 provides sealing of the butterfly valve plate 120 against the inner surface 114 of the valve flowbody 112. The butterfly valve plate 120 and the butterfly sealing assembly 126 provide for the sealing of the flow of a fluid from upstream 132 the channel 116 to downstream 134 the channel 116.

Figure 4:
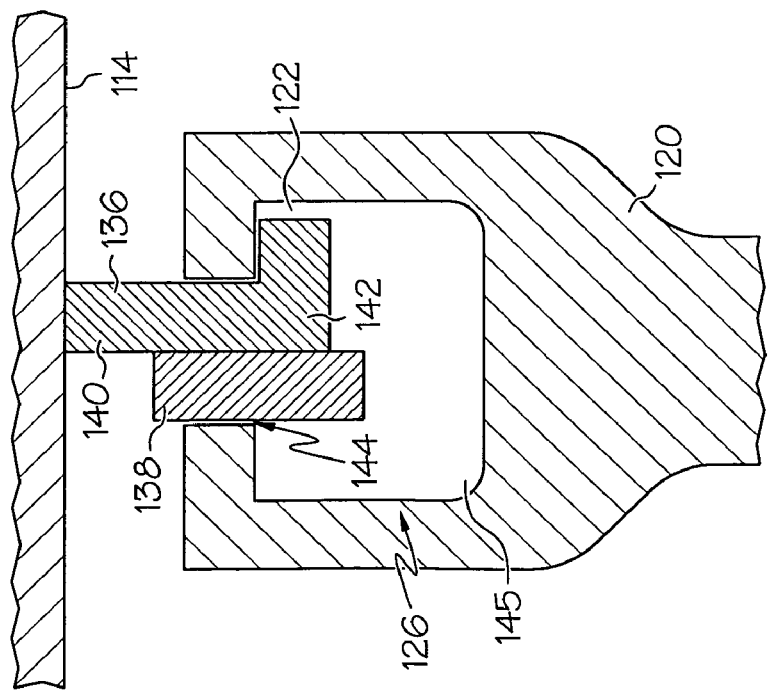
FIG. 4 is a close-up cross-sectional view of a portion of the valve assembly indicated by a dotted line 4 shown in FIG. 3, according to an embodiment.

According to an embodiment, FIG. 4 illustrates a close-up cross-sectional view of the butterfly sealing assembly 126, positioned within a periphery 125 of the butterfly valve plate 120, of the valve assembly 110 indicated by a dotted line 4 shown in FIG. 3 in which a means for restraining a butterfly valve sealing ring (described presently) is implemented. The butterfly sealing assembly 126 may include a sealing ring 136 and a retention spacer 138 positioned to retain the sealing ring 136 within the sealing ring groove 122. In this embodiment, the sealing ring 136 is formed having a substantially L-shaped cross-section. In an alternate embodiment, the sealing ring 136 may include a sloped portion, yet maintain a substantially L-shaped cross-section. In preferred embodiments the sealing ring 136 comprises a unitary structure formed from a non-metallic, steel, a metallic alloy, or some other material or combination of materials. The sealing ring groove 122 is preferably formed in a peripheral surface of the butterfly valve plate 120 and is defined by a groove opening 144 and a groove body 145. Alternatively, the sealing ring groove 122 may be formed in a surface of an element coupled to the butterfly valve plate 120, or by defining walls by adding members to the butterfly valve plate 120 while using a surface of the butterfly valve plate 120 as the floor of any such groove. In preferred embodiments, the sealing ring groove 122 is of uniform width and also of uniform depth. However, it is contemplated that alternative sealing ring groove configurations may be used.

During operation of the valve assembly 110, downstream portion of the sealing ring 136 has a tendency to expand outwards from the butterfly valve plate 120. When the butterfly valve plate 120 is opened and the sealing ring 136 is not in direct contact with the channel 116, the sealing ring 136 can further come out of the sealing ring groove 122. This displacement of the sealing ring 136 relative to the sealing ring groove 122 results in increased closing forces when trying to close the butterfly valve plate 120 and in some cases may prevent the butterfly valve plate 120 from fully closing when the sealing ring 136 becomes lodged between the butterfly valve plate 120 and the channel 116. The L-shaped cross-sectional feature limits the expansion of the sealing ring 136 when the valve assembly 110 is pressurized and minimizes the displacement of the sealing ring 136 from within the sealing ring groove 122.

During assembly of the butterfly valve plate 120, a portion of the sealing ring 136 is positioned within the sealing ring groove 122 via the groove opening 144. To facilitate this assembly, the sealing ring groove 122, including the groove opening 144 and the groove body 145, must be of a dimension sufficiently large to accommodate installation of the L-shaped cross-sectional shape of the sealing ring 136. Subsequent to position of the sealing ring 136, a retention spacer 138 is positioned within the sealing ring groove 122 to fill any gap that remains in the groove opening 144 and provide for retainment of the sealing ring 136 within the sealing ring groove 122 during pressurization.

In a preferred embodiment, the retention spacer 138 comprises a unitary structure formed from steel, a metallic alloy, or some other material or combination of materials. The retention spacer 138 is generally formed having a stiffness factor that is greater than a stiffness factor of the sealing ring 136 to minimize expansion of the retention spacer 138 from within the sealing ring groove 122. The retention spacer 138 is dimensioned to provide for retention of the sealing ring 136 within the sealing ring groove 122.

Figure 5:
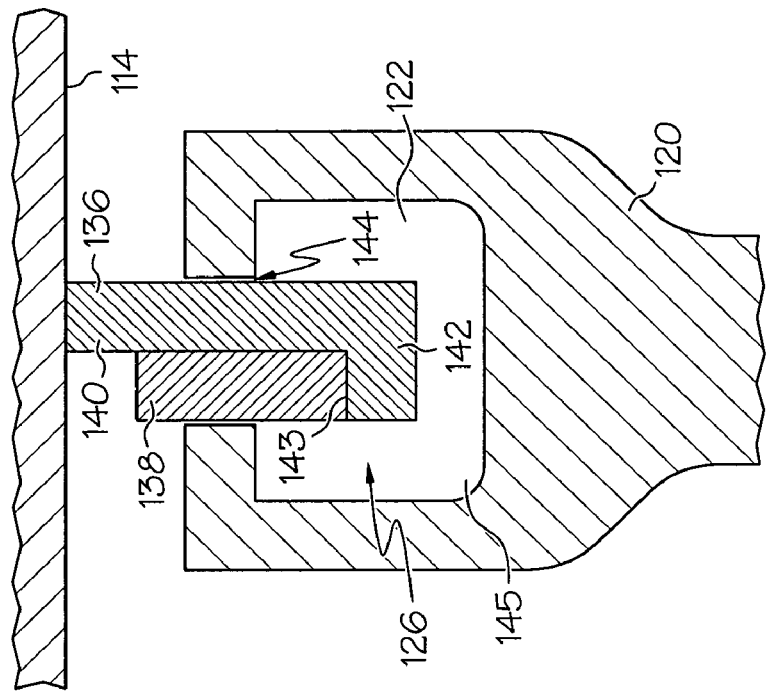
FIG. 5 is a close-up cross-sectional view of a portion of a valve assembly according to an embodiment.

Referring again to FIG. 4, in the illustrated embodiment, the sealing ring 136 includes a substantially L-shaped cross-section, and includes a first portion 140 and a second portion 142 disposed substantially perpendicular to the first portion 140. The retention spacer 138 is positioned within the groove opening 144 that forms a portion of the sealing ring groove 122 and adjacent the first portion 140 of the sealing ring 136. As best illustrated in FIG. 5, an alternate embodiment provides for positioning of the retention spacer 138 adjacent the first portion 140 of the sealing ring 136 and resting upon an uppermost aspect 143 of the second portion 142. In this embodiment, the retention spacer 138 provides for minimizing expansion of the sealing ring 136 and retainment of the sealing ring 136 within the sealing ring groove 122 during pressurization.

Figure 6:
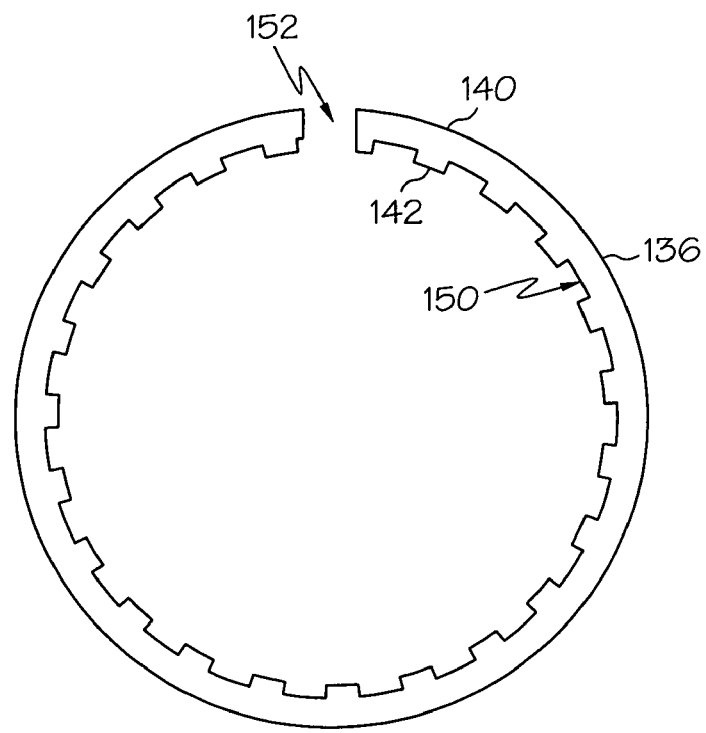
FIG. 6 is a top view of a sealing ring according to an embodiment.
Figure 7:
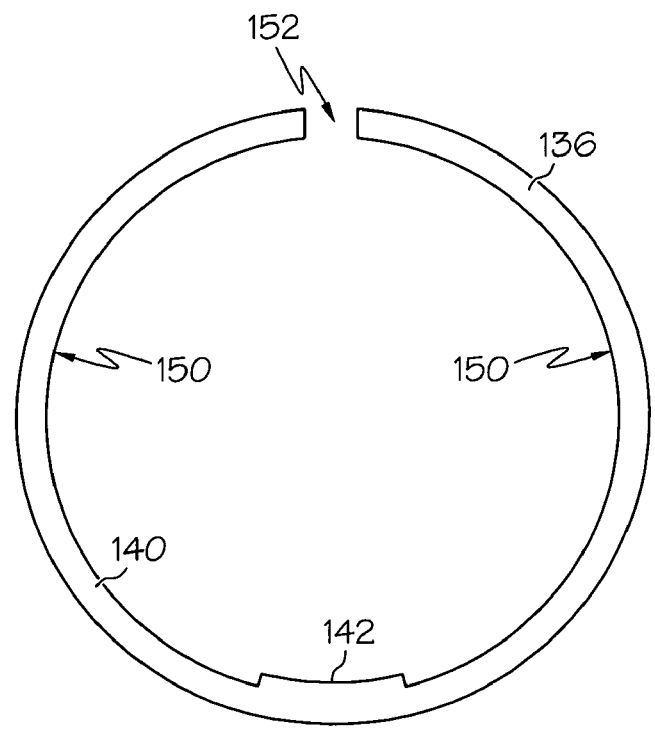
FIG. 7 is a top view of a sealing ring according to an embodiment.

As previously described, the sealing ring 136 includes a retention means for retaining the sealing ring 136 within the sealing ring groove 122 in the form of the second portion 142. In an attempt to optimize the stiffness of the sealing ring 136 and achieve desired ring tension in light of the inclusion of the retention spacer 138 as a part of the butterfly sealing assembly 126, the sealing ring 136 may include a plurality of interruptions in the second portion 142. More specifically, the sealing ring 136 may include a plurality of interruptions 150 in the second portion 142, in the form of a plurality of cut-away portions, or the like, as best illustrated in FIG. 6. The plurality of interruptions 150 may be dimensioned to provide for desired ring tension in light of the addition of the retention spacer 138 to the butterfly sealing assembly 126. In addition, the sealing ring 136 may include an opening 152 to allow for installation about the periphery of the butterfly valve plate 120. Alternatively, and as best illustrated in FIG. 7, the sealing ring 136 may include a retention means in localized areas. More specifically, the sealing ring 136 may include the second portion 142 in a localized area sufficient to provide retention of the sealing ring 136 within the sealing ring groove 122 when the valve is pressurized. Similar to the embodiment illustrated in FIG. 6, the sealing ring 136 illustrated in FIG. 7 may include the opening 152 to allow for installation about the periphery of the butterfly valve plate 120.

A butterfly valve sealing assembly has now been provided that includes a means for retaining a butterfly sealing ring within a butterfly valve groove formed about a periphery of a butterfly valve plate when under the influence of pressurized fluid forces. The sealing ring includes a retaining means generally in the form of a second portion that extends substantially perpendicular from a first portion. A retention spacer is positioned within an opening of the sealing ring groove and adjacent the first portion of the sealing ring to further retain the sealing ring within the sealing ring groove. The sealing assembly may have an increased life expectancy as compared to conventional valves incorporating traditional sealing rings that may become displaced when under the influence of a pressurized flow. In addition, the sealing assembly may be lightweight and relatively inexpensive to implement.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A butterfly valve plate sealing assembly including a butterfly valve plate having a sealing ring groove formed about a periphery, the butterfly valve plate sealing assembly, comprising:
    a unitary sealing ring disposed at least partially within the sealing ring groove defined by a groove opening and a groove body, wherein the unitary sealing ring has a substantially L-shaped cross-section and is defined by a first portion and a second portion configured perpendicular to the first portion, the first portion of the unitary sealing ring extending through the groove opening and the second portion of the unitary sealing ring including a plurality of interruptions configured to optimize stiffness for a desired sealing ring tension; and
    a retention spacer, positioned adjacent the unitary sealing ring and disposed at least partially within the sealing ring groove with a portion thereof also extending through the groove opening, the retention spacer configured to limit expansion of the unitary sealing ring when under the influence of a pressurized fluid flow and dimensioned to provide for retention of the unitary sealing ring within the sealing ring groove.

2. A butterfly valve plate sealing assembly as claimed in claim 1, wherein the groove body is configured to retain the second portion of the unitary sealing ring therein.

3. A butterfly valve plate sealing assembly as claimed in claim 2, wherein the retention spacer is positioned within the groove opening and adjacent the first portion of the unitary sealing ring.

4. A butterfly valve plate sealing assembly as claimed in claim 1, wherein the retention spacer is formed with a material having a stiffness factor that is greater than a stiffness factor of the material of the unitary sealing ring.

5. A butterfly valve plate sealing assembly including a butterfly valve plate having a sealing ring groove formed about a periphery, the butterfly valve plate sealing assembly, comprising:
    a unitary sealing ring disposed at least partially within the sealing ring groove that is defined by a groove opening and a groove body, the unitary sealing ring having a first portion, a second portion in a localized area only and configured substantially perpendicular to the first portion, and a substantially L-shaped cross-section, the groove body configured to retain the second portion of the unitary sealing ring therein, the first portion of the unitary sealing ring extending through the groove opening; and
    a retention spacer, positioned adjacent the unitary sealing ring and disposed at least partially within the sealing ring groove, the retention spacer dimensioned to provide for retention of the unitary sealing ring within the sealing ring groove and configured to limit expansion of the unitary sealing ring when under the influence of a pressurized fluid flow.

6. A butterfly valve plate sealing assembly as claimed in claim 5, wherein the retention spacer is positioned within the groove opening and adjacent the first portion of the unitary sealing ring.

7. A butterfly valve plate sealing assembly as claimed in claim 5, wherein the retention spacer is formed with a material having a stiffness factor that is greater than a stiffness factor of the material of the unitary sealing ring.

8. A butterfly valve assembly, comprising:
    a flowbody having an inner surface defining a channel;
    a butterfly plate disposed in the channel and rotationally mounted to the flowbody, the butterfly plate having a valve shaft coupled thereto and a sealing ring groove formed about a periphery of the butterfly plate;
    an actuator having an actuator output shaft coupled to the valve shaft, the actuator configured to actuate the butterfly plate; and
    a butterfly valve plate sealing assembly comprising:
        a unitary sealing ring disposed at least partially within the sealing ring groove, the unitary sealing ring having a first portion, a second portion, and a substantially L-shaped cross-section, the second portion in a localized area only and configured substantially perpendicular to the first portion; and
        a retention spacer, positioned adjacent the unitary sealing ring and disposed at least partially within the sealing ring groove, the retention spacer configured to limit expansion of the unitary sealing ring when under the influence of a pressurized fluid flow and dimensioned to provide for retention of the unitary sealing ring within the sealing ring groove.

9. A butterfly valve assembly as claimed in claim 8, wherein the sealing ring groove is defined by a groove opening and a groove body, the groove body is configured to retain the second portion of the unitary sealing ring therein, the first portion of the unitary sealing ring extending through the groove opening.

* * * * *